United States Patent [19]
Böhm

[11] Patent Number: 5,169,234
[45] Date of Patent: Dec. 8, 1992

[54] INFRARED TEMPERATURE SENSOR

[75] Inventor: Alfred Böhm, Viechtach, Fed. Rep. of Germany

[73] Assignee: Ultrakust Electronic GmbH, Ruhmannsfelden, Fed. Rep. of Germany

[21] Appl. No.: 655,532

[22] Filed: Feb. 13, 1991

[30] Foreign Application Priority Data

Dec. 2, 1990 [DE] Fed. Rep. of Germany ....... 4004408

[51] Int. Cl.$^5$ .............................................. G01J 5/10
[52] U.S. Cl. .................................. 374/128; 374/121; 356/43; 364/557
[58] Field of Search ............... 374/120, 121, 126, 127, 374/128, 130, 132, 133; 364/557; 356/43, 44; 250/338.1

[56] References Cited

U.S. PATENT DOCUMENTS

| | | | |
|---|---|---|---|
| 3,501,237 | 3/1970 | Lide, III | 374/127 X |
| 3,759,102 | 9/1973 | Murray | 374/128 X |
| 3,766,781 | 10/1973 | Roberts | 374/128 |
| 3,777,568 | 12/1973 | Risgin et al. | 374/128 |
| 4,527,896 | 7/1985 | Irani et al. | 356/43 |
| 4,634,294 | 1/1987 | Christol et al. | |
| 4,750,139 | 6/1988 | Dils | 356/44 |
| 4,765,752 | 8/1988 | Beyron et al. | 374/121 X |
| 4,790,669 | 12/1988 | Christensen | 356/44 X |

FOREIGN PATENT DOCUMENTS

| | | |
|---|---|---|
| 119824 | 9/1981 | Japan. |
| 61-30728 | 2/1986 | Japan. |
| 61-186824 | 8/1986 | Japan. |
| 63-3231 | 1/1988 | Japan. |
| 1-9327 | 1/1989 | Japan. |
| 1-92630 | 4/1989 | Japan. |
| 1207984 | 10/1970 | United Kingdom. |
| 2082767 | 3/1982 | United Kingdom. |
| 2133877 | 8/1984 | United Kingdom. |
| 2134251 | 8/1984 | United Kingdom. |

*Primary Examiner*—William A. Cuchlinski, Jr.
*Assistant Examiner*—G. Bradley Bennett
*Attorney, Agent, or Firm*—Fleit, Jacobson, Cohn, Price, Holman & Stern

[57] ABSTRACT

An infrared temperature sensor with a sensor element sensitive for infrared radiation and which generates an analog output signal, permits a speed-variable and resolution-variable infrared temperature measurement, in that at least one resolution-adjustable converter means is provided for converting the analog signal into a digital signal and in that a digital signal processing means is provided for the program-controlled linearization and evaluation of the digital signal.

28 Claims, 4 Drawing Sheets

1

INFRARED TEMPERATURE SENSOR

BACKGROUND OF THE INVENTION

The invention relates to an infrared temperature sensor with a sensor element, which generates an analog output signal, which is converted into a digital signal and processed.

Such infrared temperature sensors are used in radiation pyrometers for a non-contact temperature measurement. They are in particular suitable for measuring very high temperatures, which could only be determined with contact temperature measuring methods through very considerable effort and expenditure. Direct contact between the sensor and the very hot parts to be measured or with a possibly corrosive ambient atmosphere of the part to be measured are avoided.

Radiation pyrometers operate either with manually adjustable measurement parameters or with fixed measurement parameters, which lead to only a limited flexibility with respect to the use of such pyrometers.

Japanese patent application JP 61-30 728 (Patent Abstracts of Japan, vol. 10, No. 183; P-472, Jun. 26, 1986) describes an infrared temperature measuring device, in which an analog measurement signal is also converted into a digital signal. In said device a detector is suspended in a rotary manner, the speed of rotation being regulated as a function of the detector output signal.

Another radiation measurement device is known from JP-A-61-186824 (Patent Abstracts of Japan, vol. 11, No. 9; P-534, Jan. 10, 1987) in which, as a function of the magnitude of the measurement signal, an output signal is supplied to different amplifiers, which leads to an automatic setting of the measurement range.

The digital processing of measured quantities in radiation thermometers is known from Japanese patent application JP-A-63-3231 (Patent Abstracts of Japan, vol. 12, No. 199; Jun. 9, 1988, P-714). However, in said known device the correction and linearization of the measuring signal is carried out prior to conversion into a digital signal. The analog components used for this lead to temperature-dependent interfering influences on the measuring signal, which can have a negative influence on the measuring accuracy.

GB-A-2 13 877 describes a device enabling a determination of the temperature of gas turbine rotor blades. In this device the linearization and processing of the measuring signal take place after conversion into a digital signal. However, the field of use of this device is restricted, because it must be set to the measurement parameters on which the measurement are based.

SUMMARY OF THE INVENTION

The object of the invention is to provide an infrared temperature sensor which, in a simple manner, permits an adaptation to different measuring conditions and which permits a very temperature-stable evaluation of the sensor element output signal.

According to the invention this object is achieved through an infrared temperature sensor, which has a converter means for converting the analog output signal of the sensor element into a digital signal. The converter means comprises a voltage-frequency converter to which is series-connected to an adjustable frequency counter. This makes it possible to adapt not only the measuring range, but also the resolution or measuring speed of the infrared temperature sensor to individual requirements. The processing of the measuring signal following digitization avoids interfering influences of analog components and increases the measuring accuracy.

Advantageous further developments of the invention form the subject matter of the subclaims.

DESCRIPTION OF THE INVENTION

As a result of the inventive construction of the infrared temperature sensor the analog output signal of the sensor element is digitized well before its evaluation and linearization and as a result of the selectable resolution of the converter means a selection can be made between a very high resolution and a lower measuring speed or a lower resolution and a high measuring speed. Thus, the infrared temperature sensor is suitable for very varied measuring functions and can consequently easily be used at different measuring locations. Another advantage of the infrared temperature sensor is that the linearization and evaluation of the output signal take place after the digitization of the output signal produced by the sensor element. This avoids the need for expensive analog circuits and compensating resistors for temperature compensation through complicated linearization devices and which constitute a potential error source when using the infrared temperature sensor at different ambient temperatures. Besides linearization, the measuring range design can take place in a program-controlled manner. The invention is particularly suitable for measuring deforming or moving objects. In an advantageous further development of the invention the converter means comprises a voltage-frequency converter and a series-connected, adjustable frequency counter. Thus, the analog output signal produced by the sensor element is converted into a pulse train, whose frequency is dependent on the output signal amplitude. As a result of the series-connected, adjustable frequency counter the gate time is varied as a function of the desired resolution, which leads to a digital signal, which can be processed in the digital signal processing means. The frequency counter resolution is programmable via the signal processing means.

Advantageously a temperature sensor is located in the immediate vicinity of the sensor element and generates a temperature-dependent reference junction signal, in order to compensate temperature influences on the sensor element.

There can advantageously also be a control voltage source for generating a reference signal and as a result of which temperature influences on the evaluating circuit can be checked and compensated.

According to an advantageous further development of the invention there is also a connection for a contact temperature sensor, by means of which the emission factor can be determined.

The aforementioned measuring and reference quantities can, according to an advantageous further development of the invention, be applied via a program-controlled switch either in alternating manner to the input of the adjustable converter means and/or to several inputs of the signal processing means. The control of the converter means and the switch takes place by means of a control logic, which is located in a microprocessor of the signal processing means.

The digital signal processing means is advantageously provided with several inputs and outputs. Thus, several analog-digital converters can be provided as inputs for analog signals and reference voltages. An internal bus ($I^2$ C-bus) is provided for the in situ communication between the signal processing means and input-output equipment, e.g. for controlling a display, for connecting a keyboard for modifying measuring parameters, etc.

According to an advantageous further development of the invention the signal processing means of the infrared temperature sensor has a connection for an external bus system for inputting and outputting and by means of which connection the signal processing means is controllable and programmable. In this way a central control unit can control in a central manner several temperature sensors and other measuring devices and from said central control unit it is possible to reprogram, e.g. the measuring parameters or the linearization data. The central control unit can e.g. be formed by a personal computer. The bus system is ideally formed by a two-wire line, which with limited technical expenditure, permits the connection of several measuring stations, the signals of said stations and the central control unit taking place through a digital identification, e.g. in the multiplex process or some other coding process. The signal processing means is advantageously connected to the external bus system by means of an optical coupler, so as to avoid the transfer of interfering influences between the bus system and the digital signal processing means. The voltage supply of the signal processing means is also isolated from the mains by a d.c.-d.c. converter, if the energy supply does not take place via a two-wire line.

As a result of the infrared temperature sensor, according to the invention, a measuring device is provided, which allows a non-contact temperature measurement with a variable scan rate. It is possible to carry out an automatic emission factor correction via a connectable contact thermometer, undergo field bussing across interfaces and be linked with peripheral equal-rated and higher-rated measuring and data processing means.

BRIEF DESCRIPTION OF THE DRAWINGS

The invention is described in greater detail hereinafter relative to non-limitative embodiments and the attached drawings, wherein.

DESCRIPTION OF THE PREFERRED EMBODIMENT

Figure 1:
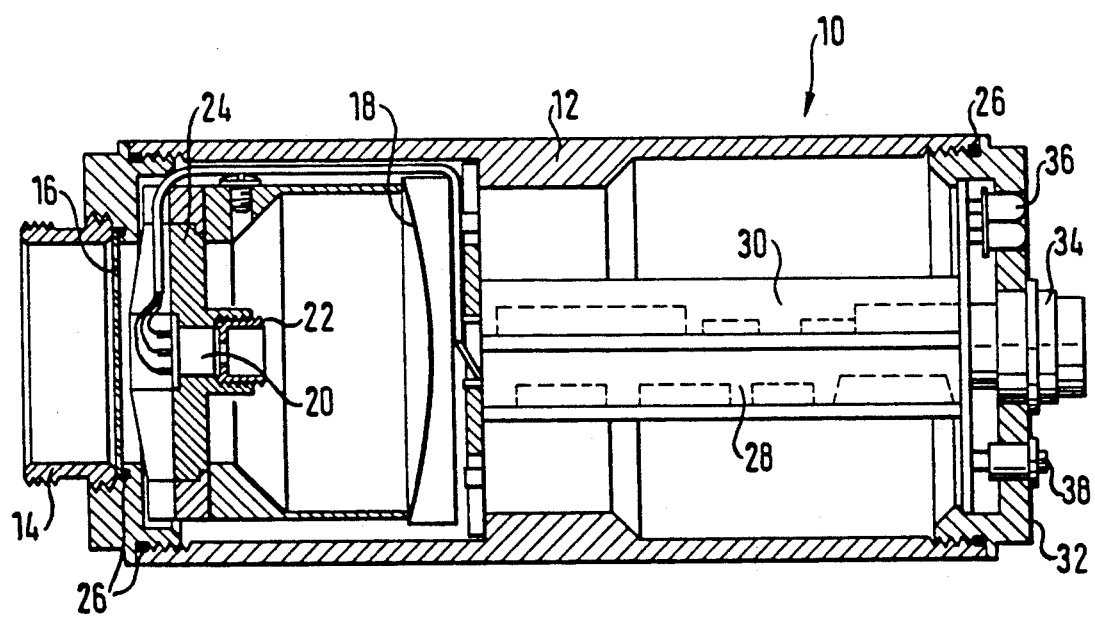
FIG. 1 illustrates a longitudinal section through an infrared temperature sensor with integrated optics and electronics.

FIG. 1 is the longitudinal section through an infrared sensor 10, which has an elongated, cylindrical casing 12. The casing is made from corrosion-resistant material shielding against electromagnetic radiation. This casing 12 houses the sensor element, the optics and the electronics of the infrared temperature sensor.

At its front longitudinal end the casing 12 has a mounting support 14, which is held in the casing 12 with a thread. This mounting support is used for fixing the solid material disk 16, which is made from a transparent material for the desired infrared radiation with a maximum transmission factor. Said disk 16 also serves as a mechanical impact protection against external influences, as well as a filter for undesired radiation. This solid material disk 16 can also be constructed as an optically active element in the form of a lens.

The infrared radiation from a measuring object passes through the solid material disk 16 onto a reflector mirror 18 through which the radiation is focussed onto a detector 20, which has a sensor element constructed as a thermopile and a temperature sensor. The detector 20 also has a filter window suitable for the radiation to be detected. Upstream of the detector 20 is positioned a circular shutter 22, which prevents marginal radiation, which, as disturbing radiation, could falsify the measurement result. The detector 20 is held by means of a mounting support 24 in the focus of the focussing reflector mirror 18. This mounting support 24 also thermally and electrically insulates the detector 20 from the casing 12.

Between the end faces and the tubular part of the casing, sealing rings 26 are provided in order to ensure a spray water seal for protecting the internal electronics and optics.

In the rear part of the casing are provided two plates 28, 30 for the converter evaluating and data transmission electronics, which will be described in greater detail hereinafter.

The rear end wall of the casing is formed by a plastic film-coated rear wall 32, in whose centre is located a multipole, watertight plug 34 for connecting the infrared sensor to the supply voltage and to a signal data line. This plug also contains connections for analog outputs and peripheral units.

The rear wall 32 also has an infrared transmission element 36, which serves to remotely control the infrared sensor from an infrared transmission element to be described hereinafter.

As the third connection the rear wall 32 has plug means 38 for a surface temperature sensor combined with an integrated contact for the start of an automatic emission factor determination. The temperature sensor is described in greater detail relative to FIG. 4.

Figure 2:
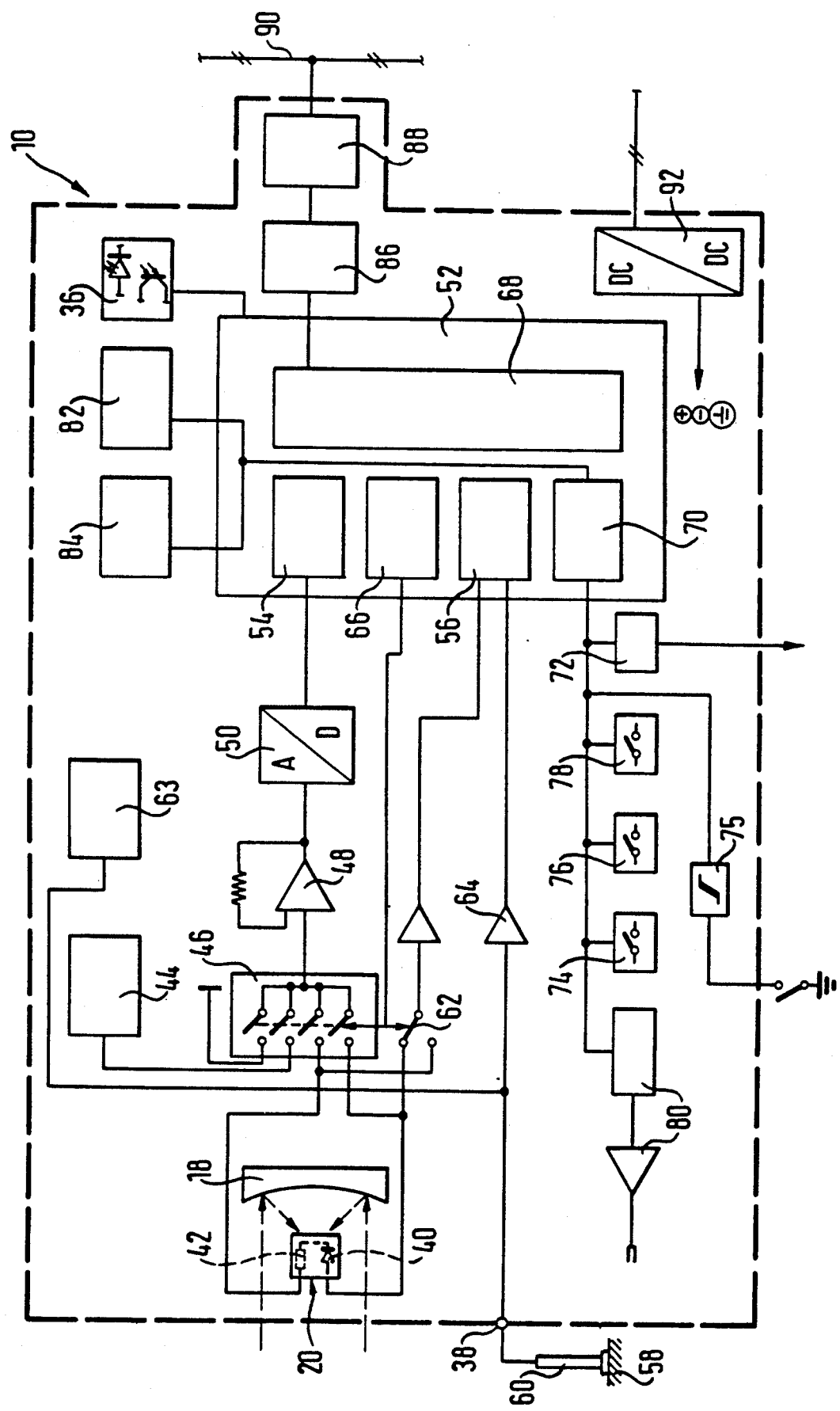
FIG. 2 is a circuit diagram of the infrared temperature sensor with the signal processing means.

FIG. 2 shows the block circuit diagram of the infrared temperature sensor 10 of FIG. 1. On the left-hand side of the block circuit diagram can be seen the optical focussing device, constructed as a reflector mirror 18, from where the entering infrared rays strike the detector 20, the detector has a sensor element 40 constructed as a thermopile and a temperature sensor 42 constructed as a thermistor which, like the sensor element 40, generates an analog output signal. The connections of the thermopile 40 and the thermistor 42 are located on a controlled channel selection switch 46 together with the output of a reference voltage source 44 for the self-calibration of the infrared temperature sensor. By means of the switch, the measuring signal of the thermopile 40, the reference junction signal of the thermistor 42 and the reference signal of the reference voltage source 44 are applied to a programmable amplifier 48, which functions as a standardization amplifier. The output of the amplifier 48 is connected to a voltage-frequency converter 50, which generates from the amplified analog signal a digital signal, whose frequency is dependent on the analog signal amplitude. The digital frequency signal is applied to a first input of a microprocessor 52, which is the heart of the signal processing means of the infrared temperature sensor 10.

The first input of the microprocessor 52 is formed by a counting module 54 with variable resolution, particularly between 8 and 16 bits. This makes it possible to determine whether measurement should take place with a very high resolution or with a high speed and lower resolution.

Figure 4:
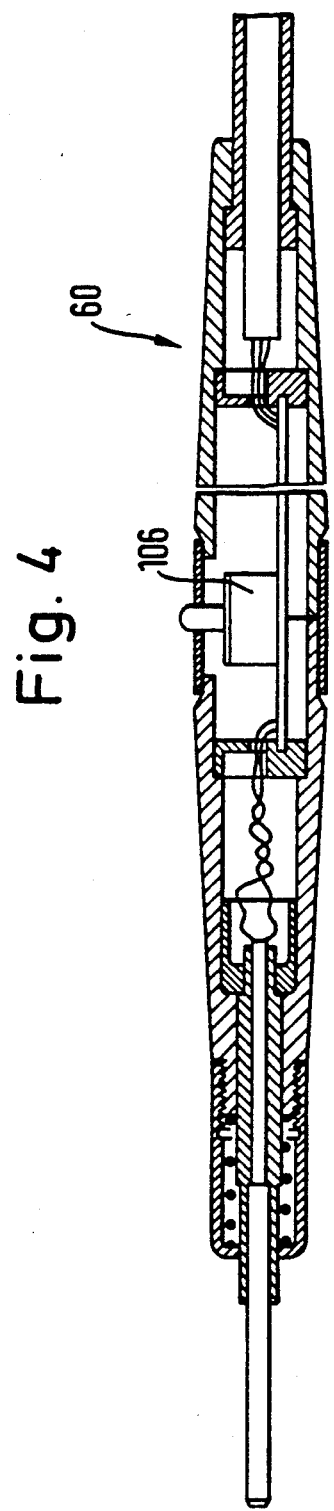
FIG. 4 illustrates a longitudinal section through a contact thermometer with a microswitch for emission factor determination.

The microprocessor 52 also has a second input constructed as a 10 bit analog-digital converter 56 for measuring the temperature of the measurement object 58 via a contact thermometer 60 for emission factor determination, the contact thermometer 60 is shown in greater detail in FIG. 4. The second input of said analog-digital converter 56 is either connected directly to the thermopile output or across a program-controlled switch 62 which is switchable between different analog output voltages and possible reference voltages. This makes it possible to e.g. carry out a rapid infrared temperature or reference junction signal measurement as a result of the parallel analog-digital conversion. The input for the contact thermometer 60 is connected to a constant current source 63 for supplying a resistance thermometer in the contact thermometer 60, the output signal of the latter being passed across an input amplifier 64 to the analog-digital converter 56. This makes it possible to determine the emission factor of an unknown radiation source and carry out an automatic emission factor correction. The determination of the emission factor of a grey radiation source is often difficult. In known means, use is frequently made of the comparison measurement method, which is then converted to the emission factor, or the temperature determined by the infrared thermometer is set equal to the measured temperature of a contact thermometer by adjusting the emission factor. However, in the known infrared temperature sensor the emission factor must be re-set for this purpose. This is unnecessary here, because the result of the surface contact measurement of the measurement object is taken into account for an automatic determination of the emission factor.

The microprocessor 52 also has a control logic 66, which controls the channel selection switch 46 and optionally the switch 62. The microprocessor 52 also has a computing logic 68, which carries out the linearization of the measurement signal, the standardization, the reference junction calculation and various compensations.

The microprocessor 52 also has an internal interface (I² C-bus) 70 constructed as a serial bus, so as to, in particular, in situ output analog signals for measured value representation or display. A serial keyboard display extension 72 as an input keyboard and measured value or state display is connected to the internal bus 70. To the latter is also connected an emission factor setting 74, an attenuation setting 76, switching outputs 78 and an analog output 80, which comprises a digital-analog converter and an amplifier. The analog output 80 serves as an analog voltage or current output for the analog voltage produced by the sensor element 40.

The microprocessor 52 is connected to an electrically erasable memory 82 for storing the sensor parameters (e.g. EEPROM) and other varying operating data. The stored values are maintained even in the case of a power failure of the infrared temperature sensor, so that said values do not have to be re-inputted. The microprocessor 52 is also connected to an EPROM and/or RAM 84, which forms the program memory of the signal processing means. It is possible to fall back on said memory via a subsequently described external bus system, in order to bring about a change to measuring ranges, limit values or analog inputs and outputs.

The microprocessor 52 is connected across an optical coupler 86 to a serial interface module 88, which is once again connected to an external bus system 90, which is constructed as a two-wire line. The latter can simultaneously be used for energy and data transmission via amplitude or frequency modulation and corresponding, commercially available uncoupling modules.

The serial interface module 88 is used as an interface driver/receiver for symmetrical or asymmetrical data transmission with different baud rate (specifically 76,800 bit/sec here).

If the external bus system 90 is not in the form of a two-wire line for simultaneous energy and data transmission, there is a d.c. voltage converter 92 in the signal processing means, which brings about a galvanic separation for isolating the sensor unit from the mains.

Figure 3:
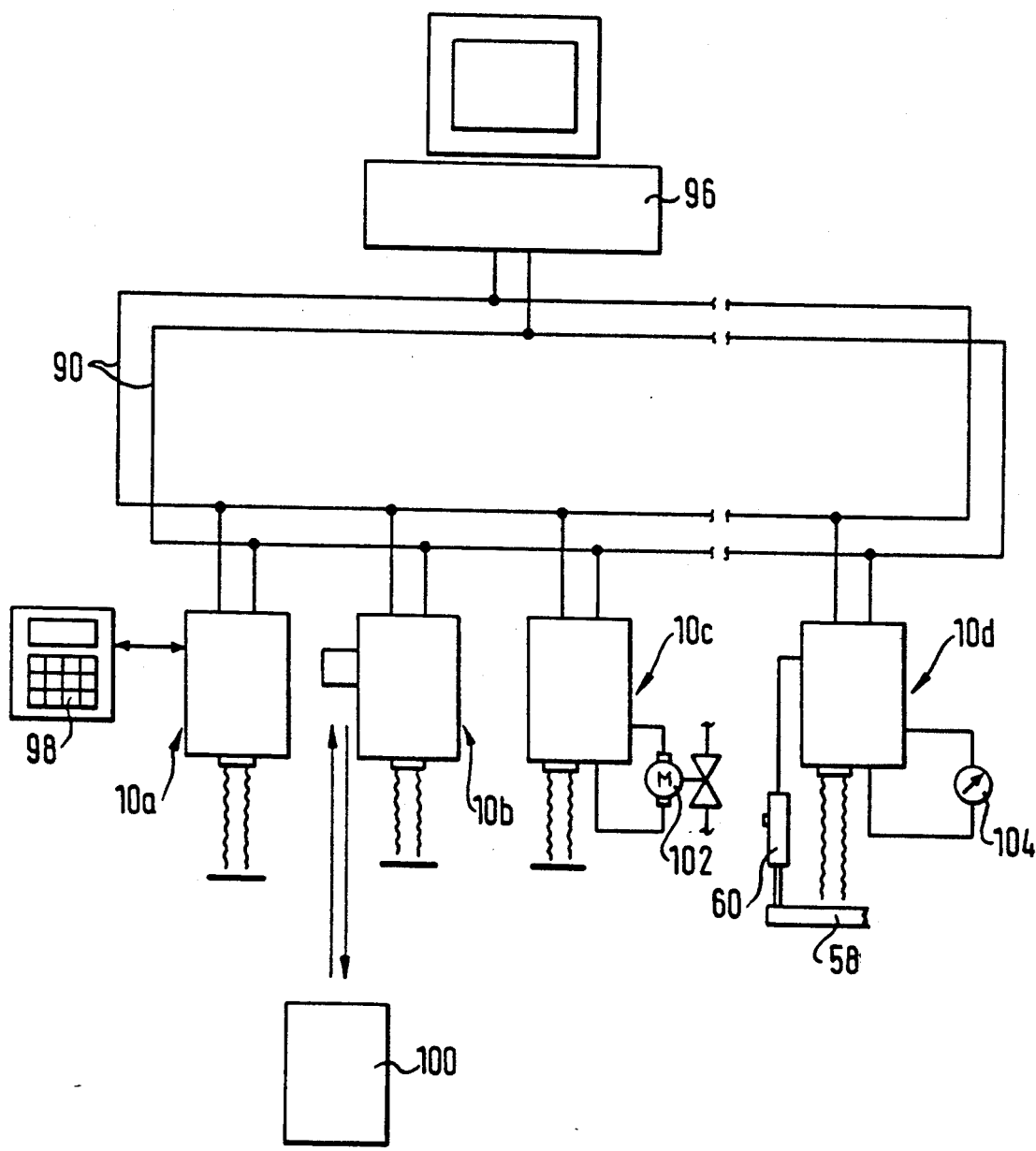
FIG. 3 is a block diagram of an interconnection with several centrally controlled infrared temperature sensors.

The microprocessor 52 is connected to an infrared transmission unit 36 having a transmitting and receiving diode for a connection-free, wireless data exchange between the sensor means 10 and an external reading or transmitting unit described in greater detail relative to FIG. 3.

FIG. 3 shows in exemplified manner configuration possibilities for several infrared temperature sensors 10a, b, c and d, which are connected across the two-wire bus 90 to a control unit 96 serving as the master. This control unit 96 can e.g. be an intelligent measuring device, a computer or a transmitter. The data transmission report can in known manner take place in random form.

A keyboard with display 98 is connected to the infrared temperature sensor 10a via the keyboard display extension 72 shown in FIG. 2.

Via the infrared transmission unit 36 shown in FIGS. 1 and 2, the infrared temperature sensor 10b is in transmission contact with a further external control unit 100, which also has an infrared transmission unit, so as to be able to control and monitor the sensor 10b from a central location.

The analog output 80 of the infrared temperature sensor 10c shown in FIG. 2 is connected to a drive 102, which is used for regulating and control functions. Control takes place across the current flow.

To the infrared temperature sensor 10d is connected a contact thermometer 60, which measures the temperature of the radiation-emitting measurement object 58. A digital or analog measured value display 104 is also connected to the infrared temperature sensor 10d.

FIG. 4 shows the contact thermometer 60, which is constructed as a feeler and has a probe 106, whose operation leads to an automatic calculation of the emission factor. This value is subsequently filed in the electrically erasable memory 84 constructed as an EEPROM and is used for calculating future measured values. If there is a calibration process without the contact thermometer, the internally set emission factor is used. The emission factor can obviously also be set via the two-wire line 90 by the central control unit 96. This is very advantageous, because infrared temperature sensors are often installed at inaccessible locations. The temperature sensor in FIG. 2 contains an input module 75 through which a measuring cycle can be started with the aid of an external trigger signal.

I claim:

1. An infrared temperature sensor comprising:

a sensor element sensitive to infrared radiation, which generates an analog output-signal;

at least one converter means for converting said analog output-signal into a digital signal; and a digital signal processing means for a program-controlled linearization and evaluation of said digital signal, said converter means comprising a voltage-frequency converter and an adjustable frequency counter, being series-connected to each other for adjusting resolution and measuring range of the temperature sensor.

2. An infrared temperature sensor according to claim 1, wherein the frequency counter is programmable.

3. An infrared temperature sensor according to claim 2 having a temperature sensor in thermal contact with the sensor element and which generates a temperature-dependent reference junction signal.

4. An infrared temperature sensor according to claim 1, wherein a control voltage source is provided for generating a reference signal.

5. An infrared temperature sensor according to claim 1, wherein the signal processing means has an analog-digital converter as an additional input for measured signals.

6. An infrared temperature sensor according to claim 1, wherein the signal processing means has a microprocessor with a computing and control logic.

7. An infrared temperature sensor according to claim 1, wherein the signal processing means has a memory for providing linearization and calibration data for measured signals.

8. An infrared temperature sensor according to claim 7, wherein the memory is programmable.

9. An infrared temperature sensor according to claim 1, wherein the signal processing means has an internal bus for inputting and outputting signals and control quantities.

10. An infrared temperature sensor according to claim 1, wherein the signal processing means has a connection for an external bus system for inputting and outputting by means of which the signal processing means is in particular controllable and programmable.

11. An infrared temperature sensor according to claim 10, wherein a central program and control unit is connected to the external bus system.

12. An infrared temperature sensor according to claim 10, wherein the connection has an optical coupler.

13. An infrared temperature sensor according to claim 10, wherein the connection has an interface module, which is connected to a bus system with a two-wire line.

14. An infrared temperature sensor according to claim 13, wherein the two-wire line is constructed both for energy and data transmission.

15. An infrared temperature sensor according to claim 1, wherein a power supply for the digital processing means has a d.c.-d.c. converter for isolation from mains.

16. An infrared temperature sensor according to claim 1, wherein the signal processing means has an infrared transmitting-receiving element for remote polling.

17. An infrared temperature sensor according to claim 16, wherein a buffer store is provided for storing a larger number of measured values between the remote polls.

18. An infrared temperature sensor according to claim 1, wherein a measuring process or a measuring sequence can be started via an externally supplied trigger signal.

19. An infrared temperature sensor according to claim 1, wherein the signal processing means has a microprocessor with a computing and control logic, a memory for providing linearization and calibration data for measured signals, an internal bus for inputting and outputting signals and control quantities and a connection for an external bus system for inputting-outputting, by means of which the signal processing means can in particular be controlled and programmed.

20. An infrared temperature sensor, comprising a sensor element sensitive for infrared radiation, for generating an analog output signal, at least one converter means adjustable with regards its resolution and its measuring range for converting the analog output signal into a digital signal, the converter means comprising a voltage-frequency converter and a series-connected adjustable frequency counter, a digital signal processing means for the program-controlled linearization and evaluation of the digital signal, a temperature sensor in thermal contact with the sensor element for generating a temperature-dependent reference junction signal and a control voltage source for generating a reference signal.

21. An infrared temperature sensor according to claim 9, wherein the analog output signal of the sensor element, the reference junction signal and optionally the reference signal are alternately applied to the input of the converter means.

22. An infrared temperature sensor according to claim 19, wherein there is a program-controlled switching for the distribution of the measured signals to inputs of the signal processing means.

23. An infrared temperature sensor according to claim 19 with an input for a contact thermometer for determining the temperature of a measurement object and for emission factor determination.

24. An infrared temperature sensor according to claim 19, wherein the memory is programmable.

25. An infrared temperature sensor according to claim 19, wherein the connection has an optical coupler.

26. An infrared temperature sensor according to claim 19, wherein the signal processing means has an infrared transmitting-receiving element for remote polling.

27. An infrared temperature sensor according to claim 26, wherein a buffer store is provided for storing a larger number of measured values between the remote polls.

28. An infrared temperature sensor according to claim 19, wherein a measuring process or a measuring sequence can be started by means of an externally supplied trigger signal.

* * * * *